United States Patent [19]

Levinson et al.

[11] E Patent Number: Re. 33,597

[45] Reissued Date of Patent: May 28, 1991

[54] HIDDEN MARKOV MODEL SPEECH RECOGNITION ARRANGEMENT

[76] Inventors: Stephen E. Levinson, 320 N. Chestnut St., Westfield, N.J. 07090; Lawrence R. Rabiner, 58 Sherbrook Dr.; Man M. Sondhi, 75 Appletree Rd., both of Berkeley Heights, N.J. 07922

[21] Appl. No.: 190,606

[22] Filed: May 5, 1988

Related U.S. Patent Documents

Reissue of:

[64] Patent No.: 4,587,670
Issued: May 6, 1986
Appl. No.: 434,516
Filed: Oct. 15, 1982

[51] Int. Cl.[5] ..... G10L 5/00
[52] U.S. Cl. ..... 381/43
[58] Field of Search ..... 381/41-50; 364/513.5

[56] References Cited

U.S. PATENT DOCUMENTS

| | | | |
|---|---|---|---|
| 3,909,532 | 9/1975 | Rabiner et al. | 381/43 |
| 4,156,868 | 5/1979 | Levinson | 381/43 |
| 4,277,644 | 7/1981 | Levinson | 381/43 |
| 4,363,102 | 12/1982 | Holmgren et al. | 381/42 |
| 4,400,788 | 8/1983 | Myers et al. | 381/43 |
| 4,481,593 | 11/1983 | Bahler | 381/43 |

*Primary Examiner*—Emanuel S. Kemeny

[57] ABSTRACT

A speech recognizer includes a plurality of stored constrained hidden Markov model reference templates and a set of stored signals representative of prescribed acoustic features of the said plurality of reference patterns. The Markov model template includes a set of N state signals. The number of states is preselected to be independent of the reference pattern acoustic features and preferably substantially smaller than the number of acoustic feature frames of the reference patterns. An input utterance is analyzed to form a sequence of said prescribed feature signals representative of the utterance. The utterance representative prescribed feature signal sequence is combined with the N state constrained hidden Markov model template signals to form a signal representative of the probability of the utterance being each reference pattern. The input speech pattern is identified as one of the reference patterns responsive to the probability representative signals.

18 Claims, 6 Drawing Sheets

HIDDEN MARKOV MODEL SPEECH RECOGNITION ARRANGEMENT

Matter enclosed in heavy brackets [ ] appears in the original patent but forms no part of this reissue specification; matter printed in italics indicates the additions made by reissue.

Our invention relates to pattern recognition and, more particularly, to arrangements for automatically identifying speech patterns.

BACKGROUND OF THE INVENTION

In communication, data processing and similar systems, it is often desirable to use audio interface arrangements. Speech input and synthesized voice output may be utilized for inquiries, commands and the exchange of data and other information. Speech type interfacing permits communication with data processor type equipment from remote locations without requiring manually operated terminals and allows concurrent performance of other functions by the user. The complexity of speech patterns and variations therein among speakers, however, makes it difficult to obtain accurate recognition. While acceptable results have been obtained in specialized applications restricted to particular individuals and constrained vocabularies, the inaccuracy of speaker-independent recognition has limited its utilization.

In general, speech recognition arrangements are adapted to transform an unknown speech pattern into a sequence of prescribed acoustic feature signals. These feature signals are then compared to previously stored sets of acoustic feature signals representative of identified reference patterns. As a result of the comparison, the unknown speech pattern is identified as the closest matching reference pattern in accordance with predetermined recognition criteria. The accuracy of such recognition systems is highly dependent on the selected features and the recognition criteria. The comparison between the input speech pattern feature sequence and a reference sequence may be direct. It is well known, however, that speech rate and articulation are highly variable.

Some prior art recognition schemes employ dynamic programming to determine an optimum alignment between patterns in the comparison process. In this way, the effects of differences in speech rate and articulation are mitigated. The signal processing arrangements for dynamic time warping and comparison are complex and time consuming since the time needed for recognition is a function of the size of the reference vocabulary and the number of reference feature templates for each vocabulary word. As a result, speaker-independent recognition for vocabularies of the order of 50 words is difficult to achieve in real time.

Another approach to speech recognition is based on probabilistic Markov models that utilize sets of states and state transitions based on statistical estimates. Speaker-dependent recognition arrangements have been devised in which spectral feature sequences are generated and evaluated in a series of hierarchical Markov models of features, words and language. The feature sequences are analyzed in Markov models of phonemic elements. The models are concatenated into larger acoustic elements, e.g., words. The results are then applied to a hierarchy of Markov models, e.g., syntactic contextual, to obtain a speech pattern identification. The use of concatenated phonemic element models and the complexity involved in unrestricted hierarchical Markov model systems, however, requires substantial training of the system by the identified speakers to obtain a sufficient number of model tokens to render the Markov models valid. It is an object of the invention to provide improved automatic speech recognition based on probabilistic modeling that is not speaker-dependent and is operable at higher speed.

BRIEF SUMMARY OF THE INVENTION

The foregoing object is achieved by storing a set of [prescribed] acoustic features of reference speech patterns and selecting a sequence of the reference pattern [prescribed] acoustic features to represent an input utterance. Templates are stored for each reference speech pattern used in recognition. Each template includes signals representative of a constrained hidden Markov model having a preselected number of states which is independent of and preferably much smaller than the number of phonemic elements in the reference speech patterns. The sequence of [prescribed] acoustic features representative of the utterance is combined with the Markov model signals of each reference template to generate signals representative of the similarity of the utterance to the reference speech patterns. Advantageously, the number of states may be selected to be substantially smaller than the number of reference pattern [prescribed] acoustic feature signals in the acoustic feature signal sequence for the shortest reference pattern. As a result of the small number of states, the recognition processing with hidden Markov model template signals is faster and has substantially lower storage requirements without reducing recognition accuracy.

The invention is directed to a speech recognition arrangement that includes storing a set of signals each representative of a [prescribed] acoustic feature of said plurality of reference patterns and storing a plurality of templates each representative of an identified spoken reference pattern. The template for each spoken reference word comprises signals representative of a first state, a last state and a preselected number of intermediate states between said first and last states of a constrained hidden Markov model of said spoken reference pattern. The number of Markov model states is independent of the number of acoustic feature elements of the identified spoken reference patterns. The template further includes a plurality of first type signals each representative of the likelihood of a [prescribed] acoustic feature being in a predetermined one of said states and a plurality of second type signals each representative of the likelihood of a transition from one of said states to another of said states of said template. Responsive to an unknown utterance, a sequence of the stored [prescribed] acoustic feature signals representative of the utterance is formed. The sequence of [prescribed] feature signals representative of the utterance and the constrained hidden Markov model signals of the reference word template are combined to produce a third type signal representative of the likelihood of the unknown utterance being the spoken reference pattern. The third type signals are compared to identify the utterance as the reference pattern. *In a specific embodiment of the invention, the acoustic feature signals representative of reference speech patterns are prescribed to be vector-quantized representations of the speech patterns.*

GENERAL DESCRIPTION

Figure 1:
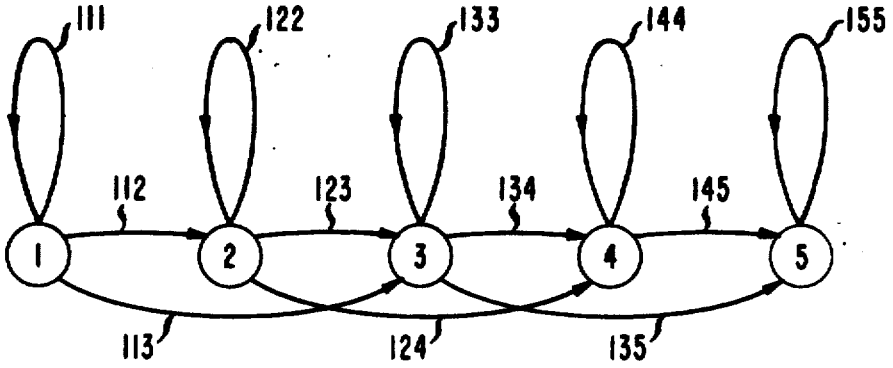
FIG. 1 shows a schematic diagram of a constrained hidden word Markov model such as used in the invention.

As is well known in the art, a hidden Markov model may be used to evaluate a sequence of observations $O_1, O_2, \ldots, O_T$ where each observation is a discrete symbol of a finite number of symbols. The sequence of observations may be modeled as a probabilistic function of an underlying Markov chain having state transitions that are not directly observable. FIG. 1 is illustrative of such a model.

In FIG. 1, there are N, e.g., 5 states and M, e.g., 64 output symbols. The transitions between states is represented by a transition matrix $A=[a_{ij}]$. Each $a_{ij}$ term is the probability of making a transition to state j given that the model is in state i. The output symbol probability of the model is represented by a matrix $B=[b_j(O_t)]$, where $b_j(O_t)$ is the probability of outputting symbol $O_t$, given that the model is in state j. The hidden Markov model may be used to derive a set of reference pattern models, one for each pattern in the vocabulary set and to classify a sequence of observations as one of the reference patterns based on the probability of generating the unknown observations from each reference pattern model.

In speech recognition, the input speech pattern is analyzed to generate a sequence of acoustic features. Each feature may be a linear prediction coefficient vector or other acoustic features well known in the art. The generated feature vectors are compared to a finite set of previously stored LPC feature signals and transformed into a sequence of vector quantized LPC signals representative of the input speech pattern. Each of the quantized feature signals is one of a finite set of M symbols that may be used in the hidden Markov model. In the recognition mode, the quantized LPC vector feature sequence for an utterance, e.g., a word or phrase, forms the observation sequence O and the probability of O having been generated by a reference pattern model K, e.g. a word or phrase of a vocabulary set, is formed in accordance with $$P(O|M)=P_{i1}b_{i1}(O_1)a_{i1i2}b_{i2}(O_2)\ldots a_{iT-1iT}b_{iT}(O_T) \quad (1)$$

where $i_1, i_2, \ldots i_T$ is the maximum likelihood sequence of Markov model states and $O_1, O_2, \ldots, O_T$ is the observed sequence. Equation 1 may be written in terms of the forward partial probability $\phi_t(i)$ defined as $$\phi_t(i)=P(O_1O_2\ldots O_t \text{ and maximum likelihood sequence ending in state i at time t}|K) \quad (2)$$

$\phi_{t+1}(j)$ can then be evaluated as $$\phi_{t+1}(j) = \max_i\{\phi_t(i)a_{ij}b_j(O_{t+1})\} t = 1, 2, \ldots \tau - 1$$

for $$1 \leqq j \leqq N$$

and $$\max\{1, j-2\} \leqq i \leqq j$$

where $$\phi_1(i) = \begin{cases} b_1(O_1) \text{ for } i = 1 \\ O \text{ otherwise} \end{cases} \quad (3)$$

so that Equation 1 becomes $$P(O|K)=P=\phi_T(N) \quad (4)$$

After the probability signal for each reference pattern model has been generated, the input speech pattern may be identified as the reference pattern model corresponding to the highest probability signal.

Figure 2:
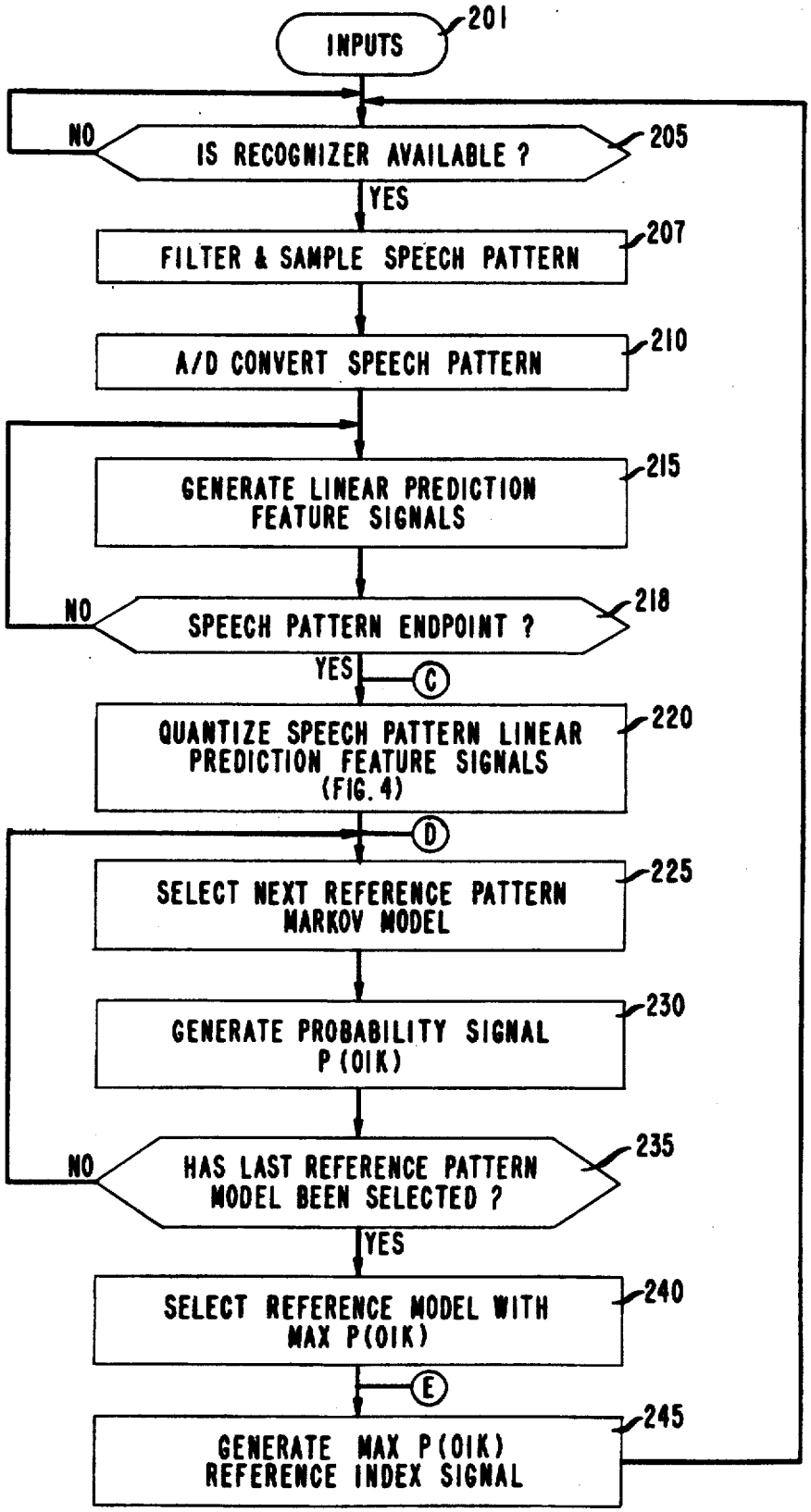
FIG. 2 depicts a general flowchart illustrating the invention.

FIG. 2 shows a general flow chart that illustrates the operation of a hidden Markov model speech recognizer in accordance with the invention. When the recognizer is available (box 205), the input speech pattern is converted to a sequence of digital signals representative thereof as per box 210. The speech representative digital signals (box 210) are then transformed into a time frame sequence of linear predictive feature signals (box 215). While the signals generated by the operation of box 215 correspond to the acoustic features of the input speech pattern, the signals therefrom are not constrained to a finite set. Operation box 220 is effective to compare the speech pattern acoustic features to a finite set of linear predictive feature vectors and select the closest corresponding stored vector for each speech pattern feature signal. In this manner, a vector quantized feature signal from a predetermined finite set is obtained for every successive frame t of the speech pattern. The vector quantized feature signal is then the observation input to the hidden Markov model processing in frame t.

A set of predetermined models is stored. A single model is provided for each reference pattern in the recognizer vocabulary. The reference pattern model includes a state output symbol signal matrix for each model state and a transition probability signal matrix corresponding to all possible transitions between states for the reference pattern model. The reference pattern models are selected sequentially as indicated in box 225 and the probability that the LPC vector quantized feature sequence of the input speech pattern is obtained from the selected reference word model is generated and stored (box 230). After the last reference pattern model has been selected and the probability signal therefor produced, the maximum of the probability signals is selected and a signal identifying to the best reference pattern is transferred to a utilization device such as a data processor or a control system.

In accordance with the invention, the hidden Markov model for each reference pattern has the number of states, e.g. 5, limited to be less than the number of feature signal time frames in the reference pattern and is constrained so that state 1 is always the first frame initial state, only a prescribed set of left-to-right state transitions are possible, and a predetermined final state is defined from which transitions to other states cannot occur. These restrictions are illustrated in the state diagram of FIG. 1. With reference to FIG. 1, state 1 is the initial state, state 5 is the final or absorbing state, and the prescribed left-to-right transitions are indicated by the directional lines among the states.

According to the state diagram of FIG. 1, it is only possible to reenter state 1 via path 111, to proceed to state 2 via path 112, or to proceed to state 3 via path 113 from state 1. In general, transitions are restricted to reentry of a state or entry to one of the next two states. We have found that these restrictions permit rapid and accurate recognition of speech patterns. The generation of the identified utterance reference pattern models for the recognizer are not restricted to the speech patterns of one identified speaker but may be derived from utterances of many different speakers so that the speech recognition is speaker independent.

DETAILED DESCRIPTION

Figure 3:
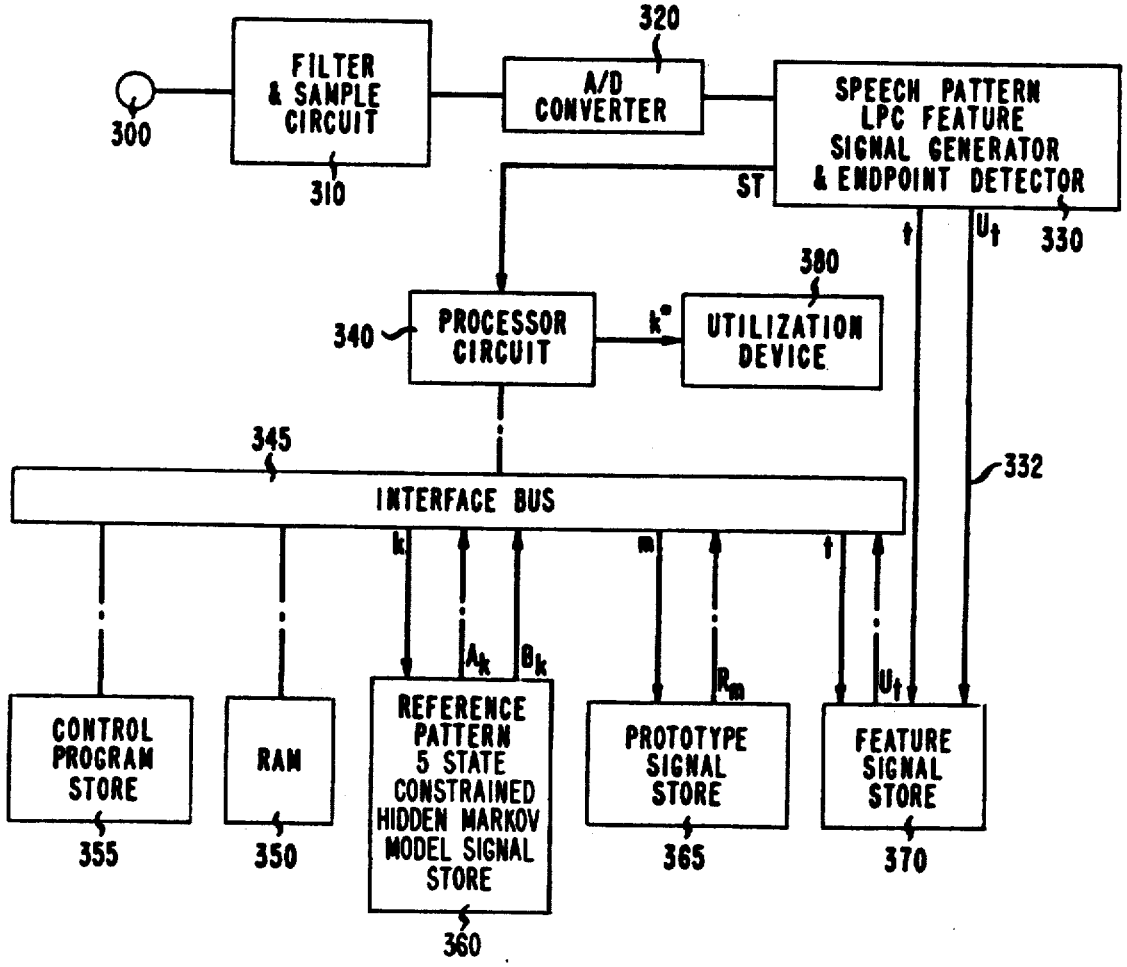
FIG. 3 depicts a block diagram of a speech recognizer circuit illustrative of the invention.

FIG. 3 shows a general block diagram of a speech recognizer illustrative of the invention. The circuit of FIG. 3 is adapted to recognize speech patterns applied to electroacoustic transducer 300 and to provide prescribed control signals to utilization device 380 responsive to the identified pattern. In FIG. 3, filter and sampler circuit 310 receives an electric analog signal from transducer 300 and is operative to lowpass filter the signal so that unwanted higher frequency noise is removed. The cutoff frequency of the filter may be set to 3.2 kHz. The filtered signal is then sampled at a 6.7 kHz rate as is well known in the art.

The sampled signal is supplied to analog-to-digital converter 320 in which each successive sample is transformed into a digitally coded signal representative of the magnitude of the corresponding sample. The sequence of coded signals is applied to LPC feature signal generator 330. As is well known in the art, generator 330 temporarily stores the digital coded signal sequence, groups them into successive overlapping frames of 45 ms duration and produces a set of P linear prediction parameter signals for each frame. Each set of these LPC signals is representative of acoustic features of the corresponding frame. It is to be understood, however, that spectral or other acoustic feature signals may be utilized by those skilled in the art.

Feature generator 330 is also operative to detect the endpoint of the input speech pattern applied to transducer 300 on the basis of an energy analysis of the feature signal sequence. The endpoint detection arrangement may be the one disclosed in U.S. Pat. No. 3,909,532 issued to L. R. Rabiner et al on Sept. 30. 1975. Alternatively, other well known endpoint detection techniques may be used. The feature generator may comprise a microprocessor such as the type MC68000 manufactured by Motorola, Inc. having the permanently stored set of instructions listed in Fortran language in Appendix A hereto in a read only memory (ROM) to control feature signal generation and endpoint detection.

Upon detection of a speech pattern endpoint in feature generator 330, control signal ST is enabled and sent to recognition processor 340 to initiate its operations. The recognition processor may comprise a type MC68000 microprocessor described in the publication MC68000 16 Bit Microprocessor User's Manual, second edition, Motorola Inc., 1980. The operation sequence of processor 340 is controlled by the permanently stored instruction set contained in program ROM 355. These instructions are set forth in the Fortran language listing of Appendix B hereto.

Acoustic feature signal store 370 receives the frame sequence of LPC coefficient signals representative of the input speech pattern from generator 330 and stores the feature signals in addressable frame sequence order for use by recognition processor 340. Prototype signal store 365 contains signals representative of a set of predetermined LPC prototype feature signals which cover the range of expected LPC feature signals in the input search pattern. These prototype signals provide a finite set of symbols for Markov model processing.

Markov Model Store 360 contains a set of coded signals corresponding to the hidden word Markov models of the possible reference patterns for the unknown utterance applied to transducer 300. Each Markov model comprises a set of signals, $a_{ij}$, corresponding to the probability of transitions between model states and signals $b_j(O_t)$ corresponding to the output symbol probability in each state. The output symbols $O_t$, one for each speech pattern frame t, correspond to the prototype signals in store 365. Each of stores 360 and 365 may comprise a read only memory addressable by processor 340. ROMs 360 and 365 permanently store the model and prototype signals. Store 370 may be a random access memory addressable by processor 340. RAM store 350 is utilized as an intermediate memory for the signal processing operations of the recognition processor, and interface 345 provides a communication interface between the recognition processor and the devices in FIG. 3. Bus 345 may comprise the type HBFA-SBC614 backplane manufactured by Hybricon Corporation. Alternatively, processor 340, bus 345, control memory 350 and RAM 355 may be the type 0B68K1A MC68000/MULTIBUS signal board computer manufactured by Omnibyte Corporation, West Chicago, Ill. A Q bus arrangement could also be utilized.

The circuit of FIG. 3 may be utilized to recognize many different types of patterns. For purposes of illustration, an arrangement for recognizing digits, e.g., of a telephone number or credit card number, is described. Assume an utterance of the digit "nine" is applied to transducer 300. In accordance with boxes 207 and 210 of the flow chart of FIG. 2, the input speech pattern is filtered and sampled in Filter and Sample Circuit 310 and transformed into digital signal form in A/D converter 320. The sequence of digital coded signals are supplied to the input of Feature Signal Generator 330 in which LPC coefficient feature signals are produced for the successive frames of the speech pattern "nine" as per box 215. The generated LPC feature signals are transferred to Acoustic Feature Signal Store 370 as addressed by frame index t via line 332. Decision box 218 is entered in each frame to determine whether the endpoint of the pattern has been reached. Upon detection of the endpoint, signal ST is generated in the feature signal generator and sent to recognition processor 340.

Figure 4:
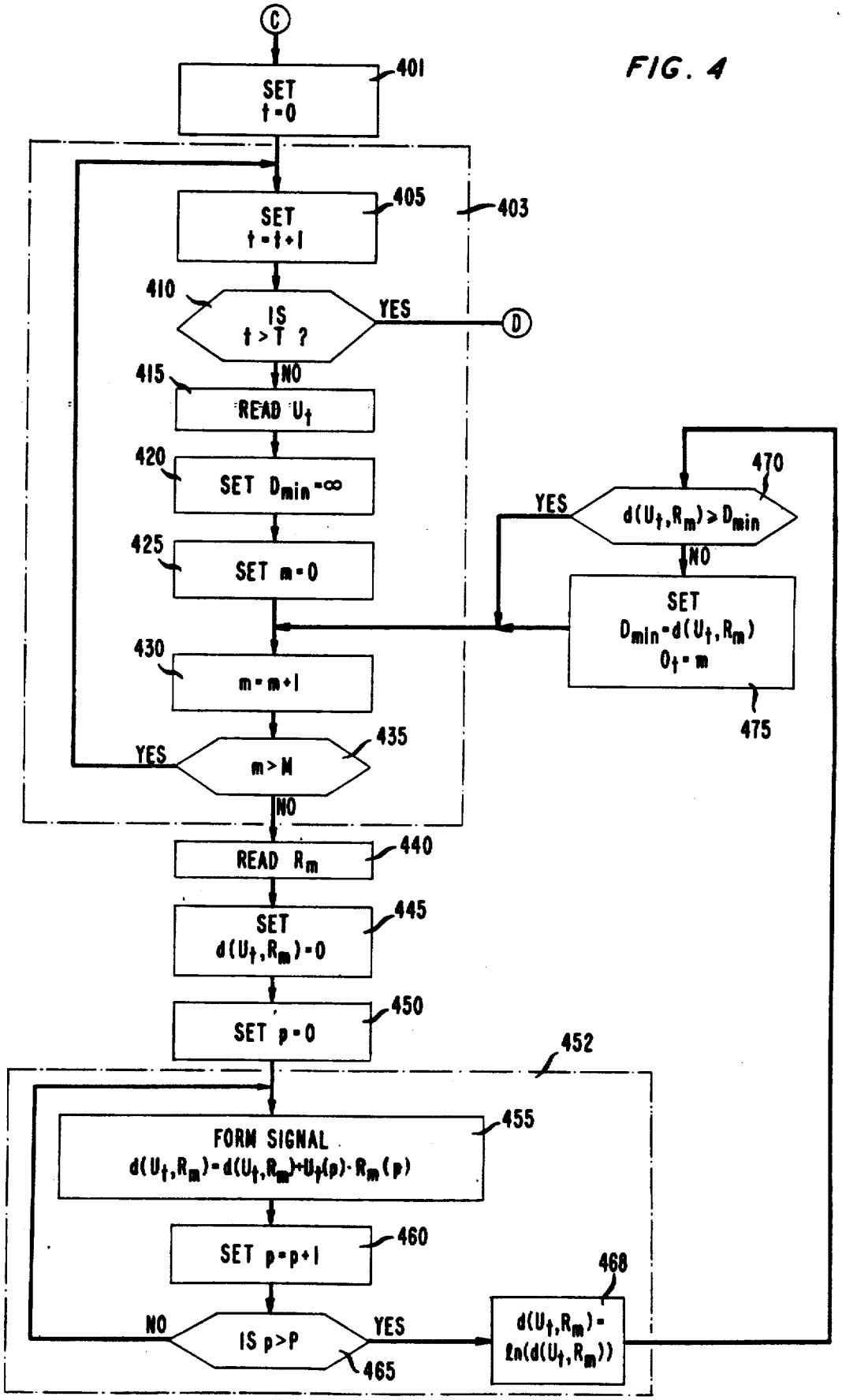

Responsive to signal ST, processor 340 is placed in its vector quantization mode during which the LPC feature signals in store 370 are quantized to the prototype signals in ROM 365 as per operation box 220. The quantization mode is shown in greater detail in the flow chart of FIG. 4, and the permanently stored instruction codes for the vector quantization mode of control program memory 355 are listed in Appendix B. Referring to FIG. 4, LPC feature signal frame index t in processor 340 is initially reset to 0 as per box 401. Loop 403 is then entered to initialize the setting of the prototype index m. In loop 403, frame index t is incremented (box 405) and the incremented frame index is compared to the last frame (T) of the input speech pattern (box 410). Until $t>T$, box 415 is entered so that the current frame input speech pattern LPC feature signal $U_t$ in store 370 is addressed by processor 340 and transferred therefrom to RAM 350. The signal representative of the minimum distance between the prototype signal and feature signal ($D_{min}$) is initially set to infinity (box 420) and the prototype index m is set to 0 in processor 340 (box 425). Box 430 is then entered in which the prototype index m is incremented in processor 340. The incremented index $m+1$ is then compared to the last index $M=64$ as per box 435.

At this time, the current prototype signal in store 365 is addressed and transferred to RAM 350 via the recognition processor (box 440). The process of determining the prototype signal $R_m$ that most closely corresponds to the current speech pattern feature signal $U_t$ may then be started in processor 340. The processor is conditioned to iteratively generate the well known Itakura distance metric signal of the form $$d(U_t, R_m) = \log \frac{aVa^t}{\hat{a}V\hat{a}^t} \tag{5}$$

for each prototype signal where $\hat{a}$ is an LPC vector from $U_t$, a is an LPC vector from $R_m$ and V is the autocorrelation matrix from $R_m$.

Initially, distance metric signal $d(U_t,R_m)$ and the feature index signal p are set to zero as per box 445 and 450. Distance signal forming loop 452 is then entered and for each feature index the distance signal is incremented in accordance with $$d(U_t, R_m) = \ln \sum_{p=1}^{P} U_t(p) \cdot R_m(p) \tag{6}$$

as per operation box 455. Index signal p is incremented in processor 340 (box 460) and box 455 is re-entered via decision box 465 until $p>P$ where P is the final feature index signal. The distance signal is converted to logarithmic form (box 468) and is then compared to $D_{min}$ in decision box 470. In the event that the current prototype distance signal is equal to or greater than $D_{min}$, box 430 is re-entered without changing $D_{min}$. Otherwise, the prototype index signal m is stored as representative of the speech pattern quantized signal for frame t and the distance signal for prototype m is stored as $D_{min}$ in RAM 350. Box 430 is then re-entered. When $m>M$ in box 435, $O_t=m$ is then selected as the closest corresponding quantized signal and loop 403 is entered at box 405 so that the next frame quantization can be initiated.

When speech pattern frame index t becomes greater than the final speech pattern frame T as per box 410, a sequence of quantized signal indices, $O_1,O_2, \ldots, O_t, \ldots O_T$ has been produced for the speech pattern in processor 340 and stored in RAM 350. The speech pattern corresponding to the utterance of "nine" may, for example, have 36 frames and one of 64 possible prototype signals is chosen for each frame. In this way, the speech pattern is converted into a sequence of quantized signals of a finite set. Every quantized signal index $O_t$ corresponds to a set of P linear prediction coefficients that represents the quantized acoustic feature of a frame of the speech pattern. For an utterance of the digit "nine" by an unidentified speaker, the sequence of quantized feature signals may be those listed in Table 1.

TABLE 1

| Frame No. t | Quantized Signal $O_t$ |
|---|---|
| 1 | 14 |
| 2 | 14 |
| 3 | 13 |
| 4 | 9 |
| 5 | 1 |
| 6 | 25 |
| 7 | 26 |
| 8 | 28 |
| 9 | 28 |
| 10 | 28 |
| 11 | 29 |
| 12 | 29 |
| 13 | 19 |
| 14 | 19 |
| 15 | 34 |
| 16 | 34 |
| 17 | 50 |
| 18 | 51 |
| 19 | 52 |
| 20 | 52 |
| 21 | 52 |
| 22 | 51 |
| 23 | 51 |
| 24 | 40 |
| 25 | 46 |
| 26 | 57 |
| 27 | 57 |
| 28 | 57 |
| 29 | 57 |
| 30 | 57 |
| 31 | 57 |
| 32 | 47 |
| 33 | 17 |
| 34 | 3 |
| 35 | 18 |
| 36 | 42 |

After quantization is completed, processor 340 exits the quantization mode and enters its Markov model evaluation mode of boxes 225, 230 and 235 in FIG. 2. The permanently stored instructions for the Markov model evaluation mode are listed in Fortran language in Appendix C hereto. During the model evaluation mode, the Markov models for the set of reference patterns, e.g., digits, 0,1,2, . . . , 9, are successively selected. Every model comprises an A matrix of the transition probability signals and a B matrix of symbol output probability signals. The A matrices for the digits 0, 5 and 9 are shown by way of example, in Tables 2, 3 and 4, respectively. Asterisks represent transitions that are prohibited by the model and are evaluated as zero.

TABLE 2

| | Digit 0 A Matrix | | | | |
|---|---|---|---|---|---|
| State i | 1 | 2 | 3 | 4 | 5 |
| j | | | | | |
| 1 | .821 | * | * | * | * |
| 2 | .143 | .801 | * | * | * |
| 3 | .036 | .199 | .800 | * | * |
| 4 | * | .000 | .079 | .880 | * |
| 5 | * | * | .122 | .120 | 1.000 |

TABLE 3

| | Digit 5 A Matrix | | | | |
|---|---|---|---|---|---|
| State i | 1 | 2 | 3 | 4 | 5 |
| j | | | | | |
| 1 | .852 | * | * | * | * |
| 2 | .136 | .932 | * | * | * |
| 3 | .013 | .067 | .800 | * | * |
| 4 | * | .000 | .054 | .922 | * |
| 5 | * | * | .146 | .078 | 1.000 |

TABLE 4

| | Digit 9 A Matrix | | | | |
|---|---|---|---|---|---|
| State i | 1 | 2 | 3 | 4 | 5 |
| j | | | | | |
| 1 | .793 | * | * | * | * |
| 2 | .106 | .939 | * | * | * |
| 3 | .100 | .061 | .690 | * | * |
| 4 | * | .000 | .142 | .930 | * |
| 5 | * | * | .168 | .070 | 1.000 |

Each of the A matrix tables is a 5×5 matrix representative of the probabilities of all transitions among the five states of the model of FIG. 1. As indicated in Tables 2, 3 and 4, only left-to-right transitions in FIG. 1 which do not have * or zero values are possible as per the constraints of the model. B matrices for the digits 0, 5 and 9 are shown in Tables 5, 6 and 7, respectively. Each column entry in Table 5 represents the probability of a particular prototype signal in the corresponding state for utterances of the digit "zero".

TABLE 5

| | State | | | | |
|---|---|---|---|---|---|
| m | 1 | 2 | 3 | 4 | 5 |
| 1 | .059 | .011 | .001 | .001 | .015 |
| 2 | .025 | .001 | .015 | .001 | .004 |
| 3 | .001 | .001 | .001 | .001 | .048 |
| 4 | .007 | .001 | .001 | .103 | .001 |
| 5 | .002 | .001 | .001 | .001 | .007 |
| 6 | .046 | .001 | .001 | .001 | .003 |
| 7 | .001 | .001 | .001 | .059 | .001 |
| 8 | .001 | .001 | .001 | .018 | .001 |
| 9 | .001 | .001 | .001 | .001 | .004 |
| 10 | .006 | .028 | .014 | .008 | .008 |
| 11 | .001 | .001 | .001 | .001 | .101 |
| 12 | .012 | .001 | .001 | .001 | .001 |
| 13 | .001 | .001 | .001 | .001 | .025 |
| 14 | .007 | .001 | .001 | .001 | .007 |
| 15 | .001 | .001 | .001 | .001 | .008 |
| 16 | .007 | .001 | .001 | .001 | .006 |
| 17 | .031 | .159 | .001 | .001 | .010 |
| 18 | .001 | .001 | .001 | .001 | .009 |
| 19 | .028 | .001 | .001 | .076 | .006 |
| 20 | .001 | .001 | .001 | .001 | .021 |
| 21 | .005 | .105 | .011 | .019 | .003 |
| 22 | .001 | .001 | .001 | .001 | .090 |
| 23 | .078 | .019 | .001 | .001 | .001 |
| 24 | .063 | .001 | .017 | .001 | .001 |
| 25 | .001 | .001 | .001 | .001 | .090 |
| 26 | .054 | .001 | .001 | .001 | .002 |
| 27 | .002 | .001 | .137 | .029 | .008 |
| 28 | .001 | .007 | .001 | .001 | .010 |
| 29 | .011 | .035 | .001 | .001 | .001 |
| 30 | .002 | .001 | .001 | .001 | .001 |
| 31 | .021 | .001 | .169 | .013 | .001 |
| 32 | .001 | .001 | .001 | .001 | .030 |
| 33 | .015 | .155 | .001 | .001 | .001 |
| 34 | .040 | .001 | .014 | .021 | .004 |
| 35 | .001 | .001 | .001 | .001 | .021 |
| 36 | .026 | .002 | .001 | .001 | .003 |
| 37 | .004 | .040 | .032 | .001 | .001 |
| 38 | .110 | .011 | .060 | .003 | .002 |
| 39 | .001 | .001 | .001 | .001 | .004 |

TABLE 5-continued

| | State | | | | |
|---|---|---|---|---|---|
| m | 1 | 2 | 3 | 4 | 5 |
| 40 | .005 | .001 | .001 | .022 | .062 |
| 41 | .001 | .001 | .001 | .001 | .033 |
| 42 | .001 | .003 | .042 | .017 | .001 |
| 43 | .044 | .062 | .001 | .001 | .001 |
| 44 | .001 | .001 | .001 | .001 | .044 |
| 45 | .066 | .058 | .012 | .001 | .001 |
| 46 | .002 | .002 | .006 | .305 | .001 |
| 47 | .001 | .001 | .001 | .001 | .034 |
| 48 | .022 | .027 | .001 | .001 | .001 |
| 49 | .019 | .001 | .001 | .001 | .001 |
| 50 | .016 | .005 | .001 | .001 | .047 |
| 51 | .017 | .006 | .132 | .223 | .009 |
| 52 | .035 | .006 | .003 | .001 | .001 |
| 53 | .015 | .010 | .022 | .004 | .004 |
| 54 | .001 | .001 | .001 | .003 | .090 |
| 55 | .011 | .141 | .001 | .001 | .006 |
| 56 | .001 | .001 | .001 | .001 | .045 |
| 57 | .028 | .001 | .268 | .006 | .001 |
| 58 | .001 | .001 | .001 | .001 | .020 |
| 59 | .001 | .001 | .001 | .001 | .006 |
| 60 | .011 | .069 | .001 | .001 | .016 |
| 61 | .001 | .001 | .001 | .003 | .006 |
| 62 | .004 | .001 | .001 | .028 | .005 |
| 63 | .004 | .001 | .001 | .001 | .001 |
| 64 | .016 | .001 | .001 | .001 | .002 |

TABLE 6

| | State | | | | |
|---|---|---|---|---|---|
| m | 1 | 2 | 3 | 4 | 5 |
| 1 | .005 | .003 | .002 | .001 | .020 |
| 2 | .001 | .001 | .001 | .001 | .005 |
| 3 | .001 | .001 | .001 | .014 | .001 |
| 4 | .001 | .001 | .001 | .001 | .001 |
| 5 | .001 | .001 | .004 | .001 | .023 |
| 6 | .001 | .001 | .001 | .001 | .009 |
| 7 | .001 | .001 | .001 | .001 | .001 |
| 8 | .001 | .001 | .001 | .001 | .001 |
| 9 | .001 | .002 | .010 | .038 | .004 |
| 10 | .001 | .001 | .001 | .001 | .004 |
| 11 | .001 | .001 | .012 | .001 | .011 |
| 12 | .001 | .001 | .001 | .001 | .001 |
| 13 | .001 | .004 | .001 | .038 | .001 |
| 14 | .001 | .010 | .004 | .001 | .031 |
| 15 | .001 | .098 | .001 | .001 | .001 |
| 16 | .004 | .001 | .075 | .001 | .004 |
| 17 | .016 | .001 | .001 | .001 | .014 |
| 18 | .001 | .001 | .001 | .001 | .001 |
| 19 | .001 | .001 | .002 | .077 | .022 |
| 20 | .001 | .396 | .019 | .009 | .001 |
| 21 | .001 | .001 | .001 | .001 | .029 |
| 22 | .001 | .001 | .001 | .001 | .001 |
| 23 | .001 | .001 | .001 | .001 | .001 |
| 24 | .001 | .001 | .001 | .001 | .012 |
| 25 | .001 | .102 | .001 | .060 | .001 |
| 26 | .001 | .001 | .001 | .001 | .010 |
| 27 | .001 | .001 | .003 | .001 | .012 |
| 28 | .001 | .001 | .001 | .001 | .001 |
| 29 | .098 | .001 | .001 | .001 | .125 |
| 30 | .001 | .001 | .001 | .001 | .001 |
| 31 | .001 | .001 | .005 | .001 | .048 |
| 32 | .001 | .001 | .001 | .001 | .001 |
| 33 | .003 | .001 | .001 | .001 | .026 |
| 34 | .001 | .001 | .001 | .001 | .026 |
| 35 | .001 | .032 | .096 | .441 | .001 |
| 36 | .001 | .001 | .001 | .001 | .017 |
| 37 | .001 | .001 | .001 | .001 | .007 |
| 38 | .001 | .001 | .001 | .001 | .068 |
| 39 | .001 | .001 | .066 | .066 | .001 |
| 40 | .003 | .001 | .360 | .128 | .013 |
| 41 | .001 | .005 | .001 | .001 | .001 |
| 42 | .001 | .001 | .001 | .001 | .001 |
| 43 | .591 | .001 | .001 | .001 | .136 |
| 44 | .001 | .001 | .001 | .001 | .001 |
| 45 | .003 | .001 | .001 | .001 | .012 |
| 46 | .001 | .001 | .001 | .001 | .004 |
| 47 | .003 | .242 | .001 | .003 | .001 |
| 48 | .001 | .001 | .001 | .001 | .025 |

TABLE 6-continued

| | State | | | | |
|---|---|---|---|---|---|
| m | 1 | 2 | 3 | 4 | 5 |
| 49 | .001 | .001 | .001 | .001 | .008 |
| 50 | .036 | .012 | .149 | .004 | .047 |
| 51 | .001 | .001 | .001 | .001 | .058 |
| 52 | .009 | .001 | .001 | .001 | .005 |
| 53 | .001 | .001 | .001 | .001 | .021 |
| 54 | .003 | .028 | .009 | .001 | .001 |
| 55 | .064 | .001 | .001 | .001 | .029 |
| 56 | .003 | .012 | .133 | .001 | .001 |
| 57 | .001 | .001 | .001 | .001 | .021 |
| 58 | .001 | .001 | .001 | .001 | .001 |
| 59 | .001 | .005 | .003 | .072 | .001 |
| 60 | .112 | .001 | .001 | .001 | .053 |
| 61 | .001 | .001 | .001 | .001 | .001 |
| 62 | .001 | .001 | .001 | .001 | .009 |
| 63 | .001 | .001 | .001 | .001 | .001 |
| 64 | .001 | .001 | .001 | .001 | .004 |

TABLE 7

| | State | | | | |
|---|---|---|---|---|---|
| m | 1 | 2 | 3 | 4 | 5 |
| 1 | .013 | .001 | .049 | .001 | .009 |
| 2 | .004 | .001 | .001 | .001 | .009 |
| 3 | .001 | .009 | .001 | .016 | .001 |
| 4 | .006 | .001 | .001 | .001 | .017 |
| 5 | .001 | .022 | .153 | .060 | .019 |
| 6 | .001 | .001 | .026 | .001 | .011 |
| 7 | .010 | .001 | .001 | .001 | .008 |
| 8 | .001 | .001 | .001 | .001 | .006 |
| 9 | .001 | .051 | .050 | .010 | .003 |
| 10 | .084 | .001 | .001 | .001 | .030 |
| 11 | .001 | .028 | .014 | .010 | .001 |
| 12 | .001 | .001 | .001 | .001 | .003 |
| 13 | .001 | .010 | .001 | .015 | .001 |
| 14 | .001 | .018 | .069 | .001 | .002 |
| 15 | .001 | .015 | .001 | .103 | .001 |
| 16 | .001 | .007 | .230 | .047 | .001 |
| 17 | .004 | .001 | .020 | .001 | .008 |
| 18 | .005 | .015 | .004 | .001 | .001 |
| 19 | .054 | .001 | .001 | .002 | .006 |
| 20 | .001 | .092 | .001 | .147 | .001 |
| 21 | .035 | .001 | .064 | .001 | .024 |
| 22 | .001 | .032 | .003 | .005 | .001 |
| 23 | .001 | .001 | .001 | .001 | .006 |
| 24 | .018 | .001 | .001 | .001 | .020 |
| 25 | .001 | .001 | .004 | .052 | .001 |
| 26 | .010 | .001 | .001 | .001 | .011 |
| 27 | .001 | .011 | .006 | .001 | .004 |
| 28 | .024 | .001 | .001 | .001 | .008 |
| 29 | .001 | .001 | .039 | .001 | .045 |
| 30 | .004 | .001 | .001 | .001 | .002 |
| 31 | .002 | .001 | .004 | .001 | .038 |
| 32 | .001 | .001 | .001 | .001 | .002 |
| 33 | .006 | .001 | .001 | .001 | .030 |
| 34 | .052 | .001 | .019 | .001 | .019 |
| 35 | .001 | .184 | .001 | .039 | .001 |
| 36 | .108 | .001 | .001 | .001 | .085 |
| 37 | .010 | .001 | .001 | .001 | .029 |
| 38 | .025 | .001 | .048 | .001 | .031 |
| 39 | .001 | .236 | .011 | .025 | .001 |
| 40 | .001 | .059 | .029 | .054 | .013 |
| 41 | .001 | .002 | .001 | .001 | .001 |
| 42 | .008 | .001 | .001 | .001 | .017 |
| 43 | .002 | .001 | .001 | .001 | .014 |
| 44 | .001 | .011 | .001 | .020 | .001 |
| 45 | .004 | .001 | .001 | .001 | .016 |
| 46 | .034 | .001 | .001 | .001 | .032 |
| 47 | .001 | .001 | .001 | .180 | .001 |
| 48 | .001 | .001 | .001 | .001 | .041 |
| 49 | .050 | .001 | .001 | .001 | .019 |
| 50 | .001 | .083 | .033 | .001 | .010 |
| 51 | .201 | .001 | .001 | .001 | .135 |
| 52 | .001 | .001 | .001 | .001 | .003 |
| 53 | .014 | .001 | .010 | .001 | .011 |
| 54 | .030 | .001 | .001 | .018 | .005 |
| 55 | .004 | .001 | .001 | .001 | .012 |
| 56 | .001 | .016 | .015 | .146 | .002 |
| 57 | .040 | .001 | .001 | .001 | .101 |

TABLE 7-continued

| | State | | | | |
|---|---|---|---|---|---|
| m | 1 | 2 | 3 | 4 | 5 |
| 58 | .006 | .001 | .001 | .001 | .001 |
| 59 | .001 | .053 | .001 | .007 | .001 |
| 60 | .001 | .002 | .062 | .001 | .006 |
| 61 | .044 | .001 | .001 | .001 | .016 |
| 62 | .048 | .003 | .001 | .001 | .008 |
| 63 | .001 | .001 | .001 | .001 | .001 |
| 64 | .010 | .001 | .001 | .001 | .035 |

There are 64 prototype probabilities in each state column so that the matrix size is 5×64. Tables 6 and 7 corresponding to digits "five" and "nine" are arranged in similar manner.

As indicated in the flow chart of FIG. 2, the Markov models stored in ROM 360 are retrieved therefrom in succession as addressed by pattern index k. For each model, a signal representative of the probability that the speech pattern quantized feature signal sequence matches the model is formed. The probability signal forming arrangements are shown in greater detail in FIGS. 5 and 6. In general, a Markov model is first selected. For the speech pattern to be recognized, the model is evaluated frame by frame with the quantized signal sequences $O_1, O_2, \ldots, O_t, \ldots O_T$ as the input. Upon completion of the evaluation for the last speech pattern frame, a signal corresponding to the maximum probability that the speech pattern quantized signal sequence was derived from the model is generated.

The restrictions of the left-to-right, hidden work Markov model used in the circuit of FIG. 3 requires that the initial state for frame t=1 be only state 1 in FIG. 1 and that the log probability signal in the initial state be $$\phi_1(1) = \ln(b_1(O_1)) \tag{7}$$

The $\phi_1(1)$ value is derived from the m=14 entry of the state 1 column of the B matrix for the digit. The log probability signals $\phi_1(i)$, i=2, 3, 4 and 5 for frame t=1 are set to $-\infty$ since these states are not permitted in the model. The ln $(\phi_2(j))$ signals are then formed for frame t=2 in accordance with $$\phi_2(j) = \max_i \{\phi_1(i) + \ln(a_{ij} b_j(O_2))\} \tag{8}$$

for max $\{1, j-2\} \leqq i \leqq j$ using the transition probability signals in the A matrix for the digit, and the symbol probability signals in the B matrix corresponding to the second speech pattern frame quantized signal index m of Table 1. For each destination size j of speech pattern frame 2, the maximum log probability signal $\phi_2(j)$ is stored. The log probability signals for the successive states in the frame sequence are then generated using the A and B matrix signals of the digit model and the frame sequence of quantized speech pattern signal indices t. After the processing of the last frame T, the maximum log probability signal is obtained for the digit model from the final state 5 in which transitions to other states are not allowed. State 5 is the absorbing state. The signal processing for the set of digits is performed successively and the largest of the maximum log probability signals as well as the corresponding digit identification signal is retained in storage. Upon completion of model processing for digit "nine", the speech pattern is identified as the digit identification code for the retained maximum log probability signal.

Figure 5:
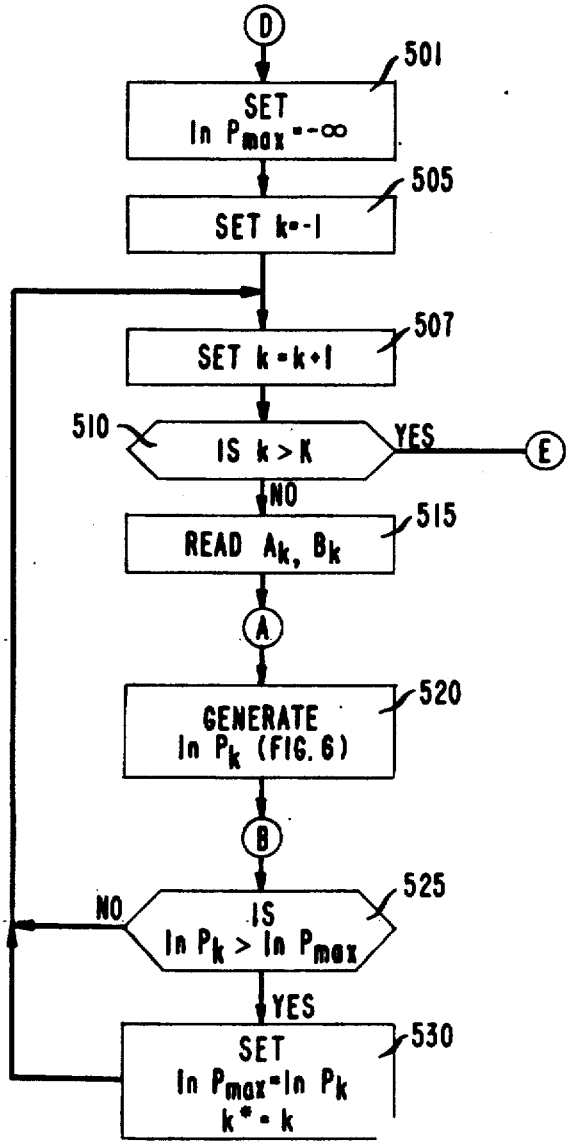
FIGS. 4, 5 and 6 are more detailed flowcharts illustrating portions of the operation of the speech recognizer circuit of FIG. 3.

The Markov model processing of boxes 225, 230, 235 and 240 of FIG. 2 are performed by processor circuit 340 are shown on the flow chart of FIG. 5. Initially, box 501 is entered from box 220 on termination of the quantization mode. The log maximum probability signal is set to its minimum value $-\infty$ and the selected reference pattern index $k^*$ is set to $-1$. The reference pattern index k is reset to $-1$ (box 505) and incremented to 0 (box 507). The current reference pattern index k is then compared to the final index value K as per box 510. Since $k=0$ at this time, box 515 is chosen and the A and B matrix signals for the $k=0$ digit, i.e., "zero", are addressed and are transferred from reference pattern Markov model signal store 360 to RAM 350 via processor circuit 340 (box 515). The log probability signal for the digit zero, $\ln P_0$ is then generated as per box 520. As aforementioned, the $\ln P_0$ signal represents the probability that the quantized input speech pattern is obtained from the Markov model for digit zero. The flow chart of FIG. 6 shows the detailed arrangements of the $\ln P_k$ signal formation.

Figure 6:
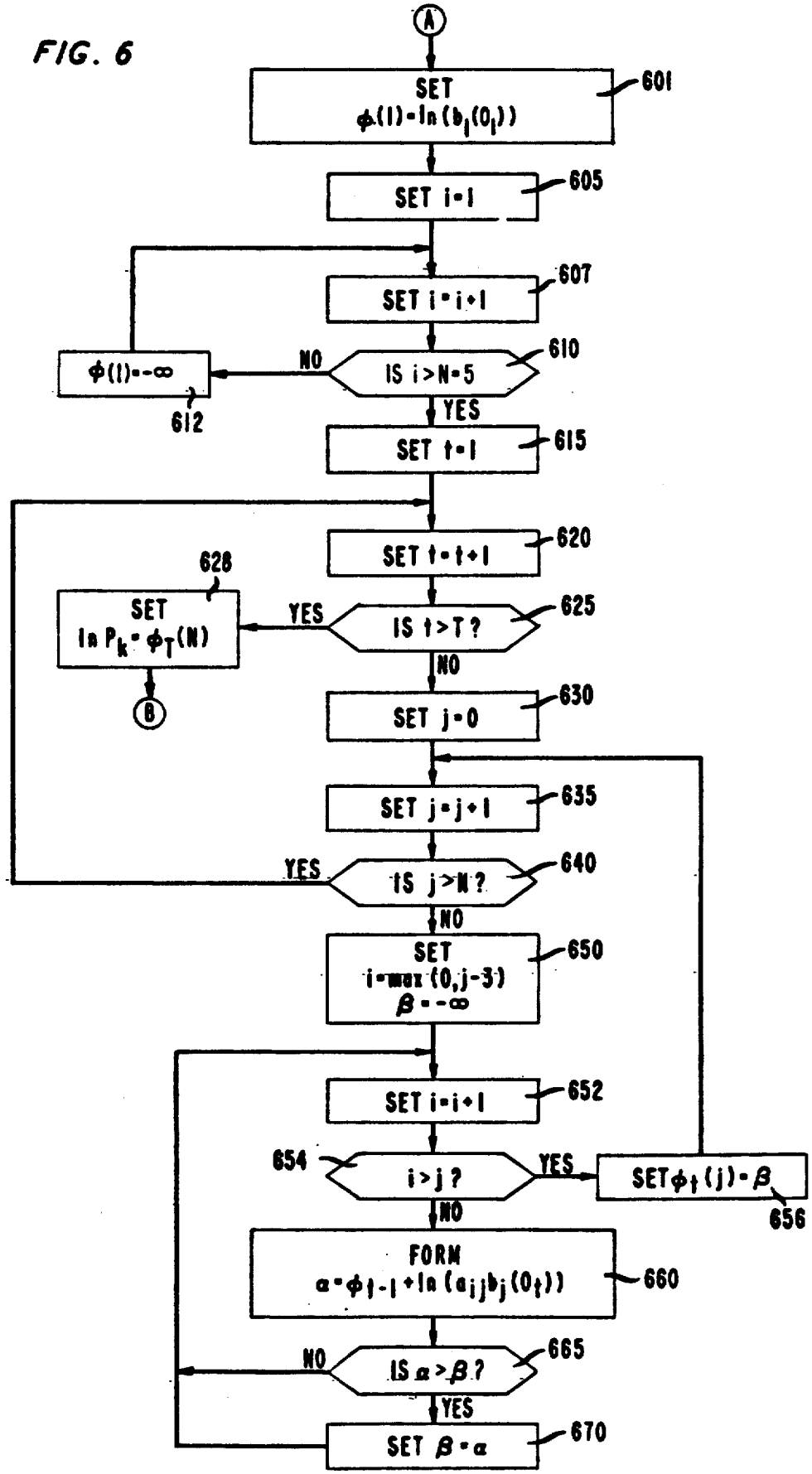
Figure 7:
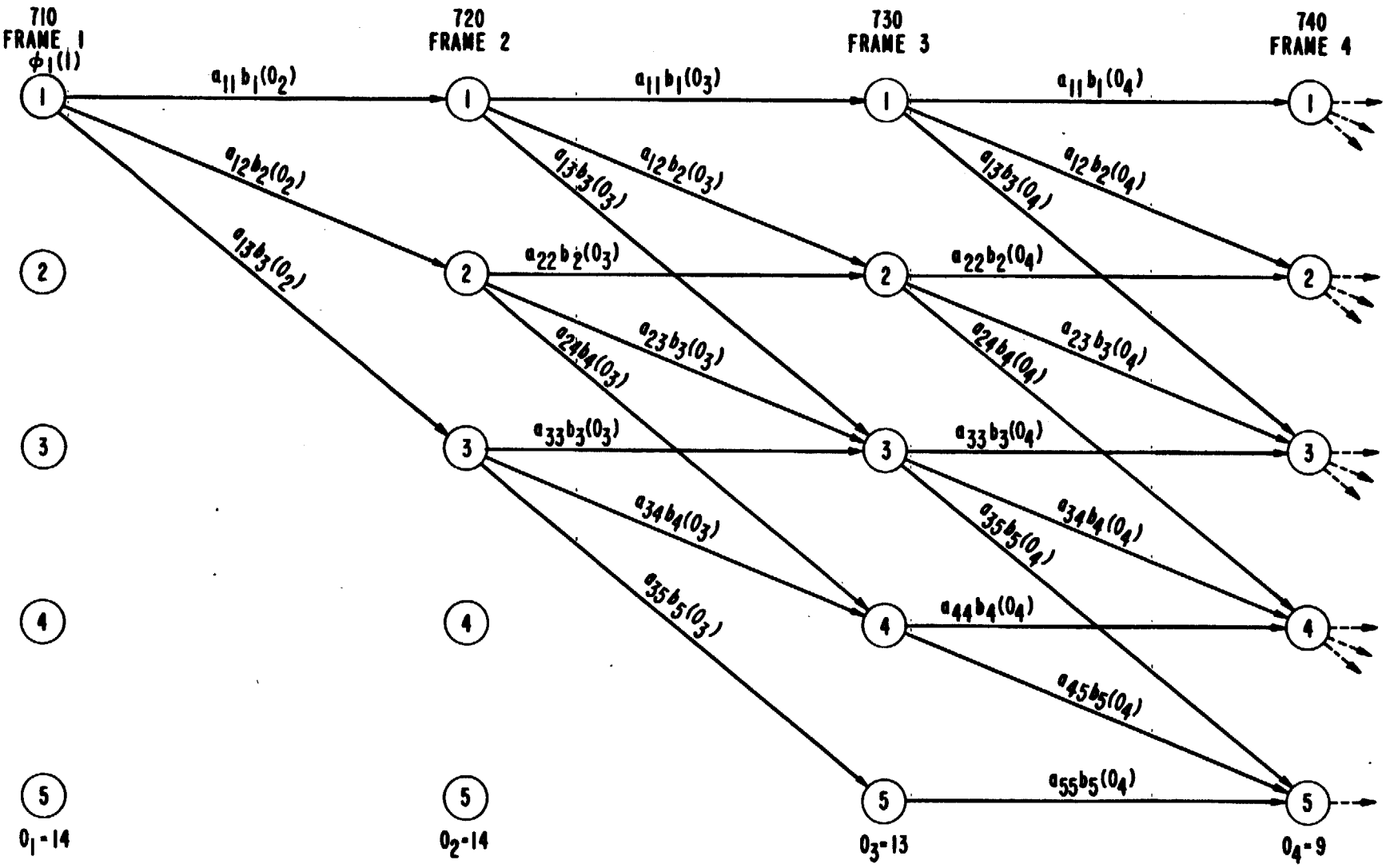
FIG. 7 shows a trellis diagram that illustrates the operation of the circuit of FIG. 3.

In FIG. 6, signal $\phi_1(1)$ is set to $\ln(b_1(O_1))$ (box 601) corresponding to the $m=14$ signal of column 1 in the B matrix of Table 5. The source state index i is set to 1 (box 605) and incremented (box 607). Until $i>N$, final state 5, $\ln \phi_1(i)$ for $i=2,3,\ldots N$ is set to $-\infty$. The set of $\phi_1(1), \phi_1(2), \ldots \phi_1(5)$ signals are stored in RAM 350. These $\phi_1(i)$ correspond to the constraint that the Markov model starts in its first state in the first speech pattern frame. FIG. 7 shows a trellis-type diagram illustrating the sequence of states of the Markov model for the successive input speech time frames 1, 2, 3 and 4. Column 710 corresponds to the first frame in which the speech pattern quantized index signal is $O_1=14$. Columns 720, 730 and 740 represent the second, third and fourth frames, respectively. The Markov states are listed in ascending order in each column. As shown in FIG. 7, only state 1 is possible in the first time frame.

After the first time frame $\phi_1(i)$ signals are formed, boxes 615 and 620 are entered in succession so that the input speech time frame index t is set to 1 and incremented. Since time frame index t is not greater than the final time frame T (decision box 625), destination state index i is set to zero as per box 630. Destination index j is incremented to 1 in box 635 and compared to the final state $N=5$ (decision box 640). In accordance with the constraints of the hidden word Markov model shown in FIG. 1, only transitions to the next two successive states are possible. Consequently, source state index i is set to zero (box 650) and incremented to 1 (box 652) to corresponding to the Markov model restrictions. $\beta$, the maximum $\phi_2(i)$, is initially set to $-\infty$ (box 650).

The incremented source state index i is compared to the current destination state index $j=1$ as per box 654 and signal forming box 660 is entered for speech pattern time frame $t=2$, source state index $i=1$ of the previous frame and destination state index $j=1$. Signal $\alpha$ in box 660 corresponds to the path from state 1 in column 710 ($t=1$) to state 1 in column 720 ($t=2$) and its value is obtained by summing previously generated signal $\phi_1(1)$ and $\ln(a_{11}b_1(O_2))$. Signal index $O_2$ is the quantized speech pattern signal for frame $t=2$ in Table 1; signal $a_{11}$ is obtained from the A matrix signals of Table 2 in column $i=1$ and row $j=1$ and $b(O_2)$ is obtained from the $m=14$ entry of the state 1 column of the zero digit B matrix of Table 5. At this time $\alpha=-10.2$, $\beta$ is set to this value as per boxes 665 and 670. Source state index incrementing (box 652) is then reentered so that i becomes 2.

Since source state index i is now greater than destination state index $j=1$, $\phi_2(1)$ is set to $\beta$ (boxes 654 and 656) and destination state index j is incremented to 2 (box 635). Source state index i is reset to 0 and incremented to 1 in boxes 650 and 652. The $\alpha$ signal for $t=2$, $i=1$, $j=2$ indices is formed in box 660. In this way, the path from column 710 state 1 to column 720 state 2 is traversed in FIG. 7. The $t=2$, $i=1$, $j=2$ value of $\alpha$ replaces the $\beta=-\infty$ signal (boxes 665 and 670).

When signal $\alpha$ is formed for $t=2$, $i=2$ and $j=2$, it is less than $\beta$ since $\phi_1(2)=-\infty$. Consequently, $\beta$ is not changed in box 670. Source state index i is then incremented (box 652). Incremented index $i=3$ is now greater than $i=2$ and $\phi_2(2)$ is set at the $\beta$ value obtained for $t=2$, $i=1$ and $j=2$ (box 656). Similarly, $\phi_2(3)$ is set to the $\alpha$ signal for $t=2$, $i=1$ and $j=3$ as indicated in FIG. 7. The $\phi_1(i)$ signals for $i>1$ were set to $-\infty$. Consequently, signals $\phi_2(j)$ for $j>3$ are set to $-\infty$. Tables 8, 9 and 10 list the $\phi_1(j)$ log probability signals for the Markov model states in each time frame t.

TABLE 8

| | State | | | | |
|---|---|---|---|---|---|
| Frame | 1 | 2 | 3 | 4 | 5 |
| 1 | −5.0 | * | * | * | * |
| 2 | −10.2 | −13.9 | −15.3 | * | * |
| 3 | −17.3 | −19.0 | −20.4 | −24.7 | −21.0 |
| 4 | −24.4 | −26.2 | −27.6 | −29.9 | −26.6 |
| 5 | −27.4 | −30.9 | −34.7 | −37.0 | −30.9 |
| 6 | −34.6 | −36.3 | −37.7 | −44.1 | −33.3 |
| 7 | −37.7 | −43.5 | −44.8 | −47.2 | −39.4 |
| 8 | −44.8 | −44.6 | −48.0 | −54.3 | −43.9 |
| 9 | −51.9 | −49.7 | −53.1 | −57.5 | −48.5 |
| 10 | −59.1 | −54.9 | −58.3 | −62.6 | −53.1 |
| 11 | −63.8 | −58.5 | −63.5 | −67.8 | −59.6 |
| 12 | −68.4 | −62.1 | −67.1 | −73.0 | −66.1 |
| 13 | −72.2 | −69.2 | −70.6 | −72.2 | −71.1 |
| 14 | 76.0 | −76.4 | −77.8 | −74.9 | −76.2 |
| 15 | −79.4 | −83.3 | −82.3 | −78.9 | −81.7 |
| 16 | −82.8 | −88.1 | −86.8 | −82.9 | −86.6 |
| 17 | −87.2 | −90.1 | −93.1 | −90.0 | −88.1 |
| 18 | −91.4 | −94.3 | −92.5 | −91.6 | −92.8 |
| 19 | −95.0 | −98.5 | −98.7 | −98.7 | −99.7 |
| 20 | −98.5 | −102.1 | −104.3 | −105.8 | −106.6 |
| 21 | −102.1 | −105.6 | −107.8 | −112.9 | −113.3 |
| 22 | −106.3 | −109.2 | −107.4 | −111.9 | −114.6 |
| 23 | −110.6 | −113.5 | −109.7 | −111.5 | −114.2 |
| 24 | −116.1 | −119.5 | −116.8 | −115.4 | −114.5 |
| 25 | −121.5 | −125.0 | −124.0 | −119.4 | −117.3 |
| 26 | −125.3 | −130.4 | −125.6 | −124.6 | −124.3 |
| 27 | −129.1 | −134.2 | −127.1 | −129.9 | −131.2 |
| 28 | −132.9 | −138.0 | −128.6 | −134.8 | −136.1 |
| 29 | −136.6 | −141.7 | −130.2 | −136.3 | −137.7 |
| 30 | −140.4 | −145.5 | −131.7 | −137.9 | −139.2 |
| 31 | −144.2 | −149.3 | −133.3 | −139.4 | −140.7 |
| 32 | −151.3 | −153.1 | −140.4 | −142.7 | −138.7 |
| 33 | −155.0 | −155.1 | −147.6 | −149.8 | −143.3 |
| 34 | −162.1 | −162.3 | −154.8 | −156.9 | −146.4 |
| 35 | −169.3 | −169.4 | −162.0 | −164.0 | −151.1 |
| 36 | −176.4 | −175.5 | −165.4 | −168.2 | −158.0 |

TABLE 9

| | State | | | | |
|---|---|---|---|---|---|
| Frame | 1 | 2 | 3 | 4 | 5 |
| 1 | −7.0 | * | * | * | * |
| 2 | −14.1 | −13.5 | −16.8 | * | * |
| 3 | −21.2 | −19.1 | −23.2 | −22.9 | −25.6 |
| 4 | −28.3 | −25.3 | −26.4 | −26.3 | −30.7 |
| 5 | −33.8 | −31.3 | −32.9 | −33.3 | −32.2 |
| 6 | −40.9 | −33.6 | −40.1 | −36.2 | −39.2 |
| 7 | −47.6 | −40.7 | −43.3 | −43.3 | −43.4 |
| 8 | −54.8 | −47.7 | −50.3 | −50.3 | −50.3 |

TABLE 9-continued

| Frame | State 1 | 2 | 3 | 4 | 5 |
|---|---|---|---|---|---|
| 9 | −61.9 | −54.7 | −57.3 | −57.3 | −57.3 |
| 10 | −69.0 | −61.7 | −64.4 | −64.4 | −64.2 |
| 11 | −71.5 | −68.3 | −71.4 | −71.4 | −66.3 |
| 12 | −74.0 | −74.9 | −78.0 | −78.5 | −68.3 |
| 13 | −81.1 | −81.9 | −83.9 | −81.1 | −72.2 |
| 14 | −88.2 | −89.0 | −90.3 | −83.8 | −76.0 |
| 15 | −95.3 | −96.0 | −97.5 | −90.8 | −79.6 |
| 16 | −102.4 | −103.0 | −104.7 | −97.8 | −83.2 |
| 17 | −105.9 | −107.5 | −106.8 | −103.5 | −86.3 |
| 18 | −113.0 | −114.5 | −114.0 | −110.5 | −89.2 |
| 19 | −117.9 | −121.5 | −121.2 | −117.6 | −94.4 |
| 20 | −122.8 | −126.9 | −128.3 | −124.6 | −99.7 |
| 21 | −127.8 | −131.8 | −134.2 | −131.7 | −105.0 |
| 22 | −134.9 | −136.7 | −139.1 | −138.7 | −107.8 |
| 23 | −142.0 | −143.7 | −146.2 | −145.7 | −110.7 |
| 24 | −148.0 | −150.8 | −147.4 | −147.9 | −115.0 |
| 25 | −154.0 | −157.0 | −148.6 | −150.0 | −119.4 |
| 26 | −160.7 | −163.0 | −155.8 | −157.0 | −123.3 |
| 27 | −167.5 | −169.7 | −163.0 | −164.1 | −127.1 |
| 28 | −174.2 | −176.4 | −170.2 | −171.1 | −131.0 |
| 29 | −180.9 | −183.1 | −177.3 | −178.2 | −134.8 |
| 30 | −187.6 | −189.8 | −184.5 | −185.2 | −138.7 |
| 31 | −194.3 | −196.6 | −191.7 | −192.2 | −142.5 |
| 32 | −200.3 | −197.8 | −198.9 | −198.2 | −149.4 |
| 33 | −204.6 | −204.8 | −206.1 | −205.2 | −153.7 |
| 34 | −211.7 | −211.8 | −213.2 | −209.6 | −160.6 |
| 35 | −218.9 | −218.8 | −220.4 | −216.6 | −167.5 |
| 36 | −226.0 | −225.8 | −227.6 | −223.7 | −174.5 |

TABLE 10

| Frame | State 1 | 2 | 3 | 4 | 5 |
|---|---|---|---|---|---|
| 1 | −6.9 | * | * | * | * |
| 2 | −14.1 | −13.2 | −11.9 | * | * |
| 3 | −21.3 | −17.8 | −19.2 | −18.1 | −20.6 |
| 4 | −28.4 | −20.9 | −22.6 | −22.8 | −26.5 |
| 5 | −33.0 | −27.9 | −26.0 | −29.8 | −29.1 |
| 6 | −40.2 | −34.7 | −31.9 | −30.9 | −34.6 |
| 7 | −45.0 | −41.7 | −39.3 | −37.9 | −38.1 |
| 8 | −49.0 | −48.7 | −46.6 | −44.9 | −43.0 |
| 9 | −52.9 | −55.7 | −53.9 | −51.9 | −47.8 |
| 10 | −56.9 | −62.1 | −61.2 | −59.0 | −52.7 |
| 11 | −64.0 | −66.1 | −62.4 | −66.0 | −55.8 |
| 12 | −71.2 | −73.1 | −66.0 | −71.3 | −58.9 |
| 13 | −74.4 | −80.1 | −73.3 | −74.0 | −63.7 |
| 14 | −77.5 | −83.5 | −80.7 | −80.2 | −68.6 |
| 15 | −80.7 | −86.7 | −83.8 | −87.2 | −72.5 |
| 16 | −83.9 | −89.9 | −87.0 | −92.7 | −76.4 |
| 17 | −91.1 | −88.6 | −89.6 | −95.9 | −81.0 |
| 18 | −92.9 | −95.6 | −96.9 | −98.5 | −83.1 |
| 19 | −100.1 | −102.1 | −102.2 | −105.5 | −88.9 |
| 20 | −107.2 | −109.1 | −109.3 | −111.1 | −94.8 |
| 21 | −114.4 | −116.1 | −116.5 | −118.1 | −100.7 |
| 22 | −116.3 | −123.1 | −123.7 | −125.1 | −102.7 |
| 23 | −118.1 | −125.4 | −125.5 | −132.1 | −104.7 |
| 24 | −125.3 | −123.2 | −123.9 | −130.4 | −109.1 |
| 25 | −132.4 | −126.1 | −127.8 | −128.8 | −113.4 |
| 26 | −135.9 | −133.1 | −135.2 | −135.8 | −115.7 |
| 27 | −139.3 | −140.1 | −142.5 | −142.8 | −118.0 |
| 28 | −142.8 | −147.1 | −148.6 | −149.9 | −120.3 |
| 29 | −146.2 | −152.0 | −152.0 | −156.9 | −122.6 |
| 30 | −149.7 | −155.4 | −155.5 | −160.9 | −124.9 |
| 31 | −153.1 | −158.9 | −158.9 | −164.4 | −127.2 |
| 32 | −160.3 | −162.3 | −162.4 | −162.6 | −134.1 |
| 33 | −166.0 | −169.3 | −166.5 | −169.6 | −138.9 |
| 34 | −173.2 | −173.0 | −173.8 | −172.6 | −145.8 |
| 35 | −178.8 | −177.2 | −179.7 | −179.6 | −152.8 |
| 36 | −183.9 | −184.2 | −186.9 | −186.6 | −156.9 |

Row 2 of Table 8 lists the values for $\phi_2(1)$, $\phi_2(2)$, $\phi_2(3)$, $\phi_2(4)$ and $\phi_2(5)$ obtained in the Markov model signal processing indicated in FIG. 6 for the second speech frame.

The second speech frame processing is completed when destination state j becomes greater than the final state N=5 in decision box 640. At that time, speech frame index t is incremented to 3 (box 620) and the processing of $\phi_3(j)$ signals is initiated in box 630. As shown in FIG. 7, the possible transitions in speech pattern frame t=3 include transitions from state 1 of frame 2 (column 720) to states 1, 2 and 3 of frame 3 (column 730), from state 2 of frame 2 (column 720) to states 2, 3 and 4 of frame 3 (column 730), and from state 3 of frame 2 (column 720 to states 3, 4 and 5 of frame 3 (column 730). The processing of $\phi_3(j)$ signals is performed as described with respect to the prior speech pattern time frames in accordance with Equation 8. In frame t=3 and succeeding frames, however, there may be more than one source state for each destination state. In FIG. 7, for example, state 2 of column 730 may be reached from states 1 and 2 of column 720 and state 3 of column 730 may be reached from states 1, 2 or 3 of column 720. For each destination state, the maximum $\alpha$ signal generated is retained as the $\phi_3(j)$ signal through the operations of boxes 665 and 670. With respect to state 2 of column 730, $$\phi_3(2) = \max\begin{cases}\phi_2(1) + \ln(a_{12}b_2(O_3)) \\ \phi_2(2) + \ln(a_{22}b_2(O_3))\end{cases}$$

The $\phi_3(1)$, $\phi_3(2)$, $\phi_3(3)$, $\phi_3(4)$ and $\phi_3(5)$ signals obtained in the t=3 frame are listed in the third row of Table 8 and the $\phi_4(j)$ signals resulting from frame t=4 frame processing are listed in the fourth row of Table 8.

The signal processing shown in FIG. 6 for the successive speech frames is performed in accordance with the constraints of the hidden word Markov model to obtain the maximum probability of the input speech pattern "nine" being derived from the model A and B matrix signals for the digit "zero" for each state in each speech pattern time frame. After $\alpha$ is obtained for indices t=36, i=5 and j=5, the processing of the last time frame (T=36) is completed through boxes 665, 670, 652, 654 and 656. The $\phi_T(N)=158.0$ signal for the final state N=5 is then generated (box 656). This signal represents the maximum log probability that the speech pattern is derived from the digit zero Markov model and is listed in the last position of the final row (t=36) in Table 8.

When frame t becomes greater than the last speech pattern frame T=36, box 628 is entered from decision box 625 and the maximum probability signal for "zero" is stored. Box 507 of FIG. 5 is then reentered and the Markov processing for the digit "one" is initiated. Tables 9 and 10 illustrate the Markov model processing for the digits five and nine, respectively.

As indicated in boxes 525 and 530, after the max log probability signal for each digit is formed, it is compared to the largest of the preceding digit probability values and only the largest value and its identity code k* are stored. When processing for digit zero is terminated, $\ln P_{max}$ is set to −158.0 (Table 8) and k* is set to 0 as per box 530. The $\ln P_k$ signals for the digit set obtained in the arrangement of FIG. 3 for the input speech pattern "nine" are those for the final absorbing state 5 in frame t=36.

| digit k | ln ($P_k$) |
|---|---|
| 0 | −158.0 |
| 1 | −160.4 |
| 2 | −184.9 |

-continued

| digit k | ln ($P_k$) |
|---|---|
| 3 | −158.8 |
| 4 | −186.0 |
| 5 | −174.5 |
| 6 | −175.3 |
| 7 | −160.4 |
| 8 | −168.9 |
| 9 | −156.9 |

Consequently, ln $P_{max}$ and k* are unchanged from digit zero until the maximum log probability signal for the digit "nine" model is compared to ln $P_{max}$ in decision box 525. As a result of the comparison box operation, box 530 is entered. The ln $P_{max}$ signal is set to −156.9 and k* is set to 9. At the end of the Markov model evaluation mode, the stored maximum probability signal is −156.9 and the selected digit k*=9.

The just described digit recognition arrangement may be utilized to recognize a series of utterances of letters, digits or words as in a telephone or credit card number. After the selection of the reference model with the maximum probability signal P(O|K) as per box 240 in FIG. 2, a reference index signal is generated (box 245) and transmitted to utilization device 280 which may be a telephone switching arrangement or a business transaction data processor. Decision box 205 is then entered so that the next speech pattern of the spoken input may be processed. The arrangement of FIG. 3 may be extended to recognize other speech patterns such as phrases or sentences by selecting appropriate Markov model reference templates. In contrast to prior Markov model speech recognition arrangements in which models of small speech elements are used, e.g., phonemes our invention utilizes a single model of the entire reference pattern, e.g., word, phrase to identify an utterance as a reference pattern. Advantageously, the number of states required for recognition is reduced, difficulties in concatenating phonemic or other elemental speech segment models are avoided and speaker-independent operation is achieved from available data bases. The Markov model templates stored in ROM 360 are generated from utterances of identified speech patterns that may be from any source and from different speakers. Patterns from readily available data banks of recorded utterances may be used to generate Markov models for the speaker for the speaker-independent recognition arrangement of FIG. 3.

While the invention has been shown and described with reference to a particular illustrative embodiment, it is to be understood that various modifications in form and detail may be made by those skilled in the art without departing from the spirit and scope thereof.

APPENDIX A

```
C       ENERGY BASED ENDPOINT DETECTOR
C
        SUBROUTINE ENDPTS(E,IS,IE)
C
C       E=ENERGY OF FRAME
C       IS=1 IF WORD HAS STARTED, 0 OTHERWISE
C       IE=1 TO INDICATE END OF WORD
C
        EMIN=1.E6
C
        IF (E.GT.EMIN.AND.IS.EQ.O) IS=1
        IF(IS.EQ.1.AND.E.LT.EMIN) IE=1
C
        RETURN
```

-continued

APPENDIX A

```
        END
C       LPCENG—CALCULATE LPC AND ENERGY
        FOR A GIVEN SPEECH FRAME
C
        SUBROUTINE LPCENG(S,NL,U,IP,N)
        DIMENSION S(300),U(200,10),R(10),PAR(10),
        APREV(10)
C
C       S=SPEECH ARRAY
C       NL=NO OF SAMPLES FOR LPC AND ENERGY
        ANALYSIS
C       U=MATRIX OF LPC COEFFICIENTS WITH
        ENERGY STORED IN LAST POSITION
C       IP=NO OF COEFFICIENTS (LPC + ENERGY)
        PER FRAME
C       N=CURRENT FRAME NUMBER
C
C       WINDOW SPEECH SAMPLES BY HAMMING
        WINDOW
C
        DO 10 J=1,NL
   10   S(J)=S(J)*(0.54–0.46*COS((6.24318*(J−1)/(NL−1))
C
C       MEASURE AUTOCORRELATION OF WIN-
        DOWED FRAME
C
        DO 20 J=1,IP−1
        R(J)=0.
        DO 15 K=1,NL−J+1
   15   R(J)=R(J)+S(K)*S(K+J−1)
   20   CONTINUE
C
C       SAVE LOG ENERGY
C
        U(N,IP)=10.*ALOG10(R(1))
C
C       CALCULATE LPC COEFFICIENTS
C
        J=1
        RES=R(J)
   30   PAR(J)=0
        J1=J−1
        IF(J1.LT.1)GO TO 50
        DO 40 K=1,J1
        IJ=J−K+1
   40   PAR(J)=PAR(J)+APREV(K)*R(IJ)
   50   PAR(J)=(−PAR(J)−R(J+1))/RES
   55   A(J)=PAR(J)
        J1=J−1
        IF(J1.LT.1) GO TO 70
        DO 60 K=1,J1
        IJ=J−K
   60   A(K)=APREV(K)+PAR(J)*APREV(IJ)
   70   RES=(1.−PAR(J)*PAR(J))*RES
        DO 80 L=1J
   80   APREV(L)=A(L)
        J=J+1
        IF(J.LE.IP−2) GO TO 30
C
C       CONVERT TO REFERENCE FORMAT
C
        APREV(1)=1.
        DO 90 J=1.IP−2
   90   APREV(J+1)=A(J)
        DO 100 J=1,IP−1
        I1=IP+I−J
        A(J)=APREV(J)
        DO 10 K=2,I1
        K1=K+J−1
  110   A(J)=A(J)+APREV(K)*APREV(K1)
  100   CONTINUE
        A(IP−1)=APREV(IP−1)
        DO 120 J=1,IP−1
        IF(J.EQ.1)U(J,I)=A(J)
        IF(J.NE.1)U(J,I)=2.*A(J)
  120   CONTINUE
C
        RETURN
        END
```

APPENDIX B

```
C       VECTOR QUANTIZER
C
        DIMENSION R(9), U(9)
        INTEGER T, O(75), P
        LOGICAL ST
C
C       SET UP CONSTANTS
C
        P=9
        M=64
        N=5
C
C       WAIT FOR RECOGNIZER TO BE AVAILABLE;
C       ST IS TRUE WHEN INPUT IS FINISHED
C
  100   IF(.NOT.ST)GO TO 100
C
C       BEGIN MAIN LOOP TO QUANTIZE EACH
        FRAME
C
        DO 2 LT=1,T
C
C       GET A FRAME OF ACOUSTIC FEATURES
C
        IDEV=370
        CALL GETDAT(IDEV,LT,P,U)
        DMIN=1.0E75
C
C       BEGIN SECONDARY LOOP TO FIND BEST
C       PROTOTYPE VECTOR
C
        DO 2 LM=1,M
C
C       GET A PROTOTYPE VECTOR
C
        IDEV=365
        CALL GETDAT(IDEV,LM,P,R)
        DUR=0.0
C
C       BEGIN INNER LOOP TO COMPUTE DISTANCE
C
        DO 1 LP=1,P
    1   DUR=DUR+U(LP)*R(LP)
        DUR=ALOG(DUR)
C
C       TEST FOR MINIMUM DISTANCE
C
        IF(DUR.IT.DMIN)O(LT)=LM
    2   CONTINUE
```

APPENDIX C

```
C       MARKOV MODEL EVALUATION
C
C       COMPUTE THE PROBABILITIES OF ALL
C       OF THE MODELS
C
        CALL MODPROB(M,N,T,O)
C
C       MAKE RECOGNIZER AVAILABLE
C
        ST=.FALSE.
        GO TO 100
        END
C
C       SUBROUTINE TO COMPUTE MODEL
        PROBABILITIES
C
        SUBROUTINE MODPROB(M,N,T,O)
        DIMENSION A(5,5), B(64,5)
        INTEGER T,O(T)
        PMAX=-1.0E75
C
C       MAIN LOOP TO COMPUTE MODEL
        PROBABILITIES
C
        DO 1 K=0.9
C
```

-continued

APPENDIX C

```
C       GET MARKOV MODEL
C
        IDEV=360
        CALL GETDAT(IDEV,K,N*(N+M),A,B)
C
C       COMPUTE LOG PROBABILITY OF MODEL K
C
        CALL VA(M,N,T,A,B,O,PK)
C
C       CHECK FOR LARGEST PROBABILITY
C
        IF(PK.LE.PMAX) GO TO 1
        PMAX=PK
        KSTAR=K
    1   CONTINUE
C
C       SEND SIGNAL TO UTILIZATION DEVICE
C
        CALL USEND(KSTAR)
        RETURN
        END
C
C       SUBROUTINE TO CALCULATE LOG
        PROBABILITY
C       OF A MODEL
C
        SUBROUTINE VA(M,N,T,A,B,O,PK)
        DIMENSION A(N,N), B(M,N), PHI(75.5)
        INTEGER T, O(T)
C
C       LOOP TO INITIALIZE PARTIAL LOG
C       PROBABILITIES
C
        PHI(1,I)=ALOG(B(0(1),1))
        DO 1 I=1,N
    1   PHI(1,I)=-1.0E75
C
C       MAIN LOOP TO CALCULATE PARTIAL LOG
C       PROBABILITIES
C
        DO 3 LT=2,T
C
C       INTERMEDIATE LOOP FOR DESTINATION
        STATES
C
        DO 3 J=1,N
        BETA=-1.0E75
C
C       SET UP CONSTRAINT ON TRANSITIONS
C
        IST=MAXO(1,J-2)
C
C       INNER LOOP TO COMPUTE BEST SOURCE
        STATE
C
        DO 2 I=IST,J
        ALPHA=PHI(LT-1,I)+ALOG(A(I,J)*B(O(LT)J))
        IF(ALPHA.GT.BETA)BETA=ALPHA
    2   CONTINUE
C
C       STORE BEST INTERMEDIATE PROBABILITY
C
    3   PHI(LT,J)=BETA
C
C       STORE MODEL PROBABILITY
C
        PK=PHI(T,N)
        RETURN
        END
```

What is claimed is:

1. A speech analyzer for recognizing an utterance as one of a plurality of reference patterns each having a frame sequence of acoustic feature signals comprising:

means for storing a set of K signals each representative of a prescribed acoustic feature of said plurality of reference patterns;

means for storing a plurality of templates each representative of an identified spoken reference pattern, the template of each spoken reference pattern comprising signals representative of a first state, a last state and a preselected number N−2 intermediate states between said first and last states of a constrained hidden Markov model of said spoken reference pattern, N being independent of the number of acoustic feature frames in the acoustic feature frame sequence of the identified spoken reference pattern, a plurality of first type signals each representative of the likelihood of a prescribed acoustic feature signal of a reference pattern frame being in a predetermined one of said states, and a plurality of second type signals each representative of the likelihood of a transition from a prescribed acoustic feature signal in one of said states to another of said states of said template;

means responsive to the utterance for forming a time frame sequence of acoustic feature signals representative of the speech pattern of the utterance;

means responsive to said utterance feature signal sequence and said stored prescribed acoustic feature signals for selecting a sequence of said prescribed feature signals representative of the utterance speech pattern;

means jointly responsive to said sequence of prescribed feature signals representative of the utterance and the reference pattern template N state constrained hidden Markov model signals for combining said utterance representative sequence of prescribed feature signal sequence with said reference pattern N state Markov model template signals to form a third type signal representative of the likelihood of the unknown utterance being the spoken reference pattern; and means responsive to the third type signals for the plurality of reference patterns for generating a signal to identify the utterance as one of the plurality of reference patterns.

2. A speech analyzer according to claim 1 wherein said third type signal generating means comprises:

means for successively generating speech pattern frame processing interval signals for the sequence of prescribed acoustic feature signals;

means operative in the current speech pattern frame processing interval responsive to the utterance representative prescribed feature signal of the current speech pattern frame and the reference pattern template N state constrained hidden Markov model signals for producing a set of signals representative of the likelihood of the utterance speech pattern being in a prescribed state of the Markov model template during said speech frame; and means operative in the speech pattern frame processing intervals responsive to the likelihood representative signal corresponding to the reference pattern Markov model template being in the last state during the last speech pattern frame for forming a signal representative of the probability of the speech pattern being obtained from the reference pattern N state Markov model template.

3. A speech analyzer according to claim 2 wherein:

said means for producing said set of likelihood representative signals in each speech pattern frame processing interval comprises means responsive to the first and second type signals for generating a set of signals representative of the probability that the reference template Markov model for the utterance speech pattern portion up to the current frame is in each of the reference template Markov model states.

4. A speech analyzer according to claim 1 wherein N is smaller than the number of frames in the sequence of acoustic feature signal frames of the smallest of said reference patterns.

5. A speech analyzer according to claim 3 wherein:

said means for storing the set of K prescribed feature signals comprises means for storing K linear predictive feature prototype signals covering the range of acoustic features of the frame sequence of acoustic feature of the reference patterns; and said means for forming a sequence of acoustic feature signals representative of the utterance speech pattern comprises means for forming a sequence of linear predictive feature signals representative of the utterance speech pattern.

6. A speech analyzer according to claim 3 wherein the second type signals corresponding to transitions from a first distinct state $i<N$ to a second distinct state $j<=N$, $j<i$ and $j \leqq i+2$ are zero value signals.

7. A speech analyzer according to claim 1, 2, 3, 4, 5, or 6 wherein said speech pattern is an utterance of a word and each reference pattern is an identified spoken word speech pattern.

8. A method for recognizing an utterance as one of a plurality of reference patterns each having a time frame sequence of acoustic feature signals comprising the steps of:

storing a set of K signals each representative of a prescribed acoustic feature of said plurality of reference patterns;

storing a plurality of templates each representative of an identified spoken reference pattern, the template of each spoken reference pattern comprising signals representative of a first state, a last state and a preselected number N−2 of intermediate states between said first and last states of a constrained hidden Markov model of said spoken reference pattern, N being independent of the number of acoustic feature frames in the acoustic feature frame sequences of the identified spoken reference patterns, a plurality of first type signals each representative of the likelihood of a prescribed acoustic feature of a reference pattern frame being in a predetermined one of said states, and a plurality of second type signals each representative of the likelihood of a transition from a prescribed acoustic feature signal in one of said states to another of said states of said templates;

forming a time frame sequence of acoustic feature signals representative of the speech pattern of the utterance;

selecting a sequence of said prescribed feature signals representative of the utterance speech pattern responsive to the utterance feature signal sequence and the K stored prescribed acoustic feature signals;

combining said sequence of prescribed feature signals representative of the utterance and the N state constrained hidden Markov model signals of the reference pattern template to form a third type signal representative of the likelihood of the unknown utterance being the spoken reference pattern; and generating a signal to identify the utterance as one of the reference patterns responsive to the third type signals for the plurality of reference patterns.

9. A method for recognizing an utterance as one of a plurality of reference patterns according to claim 8 wherein generation of said third type signals comprises the steps of:

successively generating speech pattern frame processing interval signals;

in the current speech pattern frame processing interval responsive to the prescribed feature signal of the current utterance speech pattern frame and the reference pattern template N state constrained hidden Markov model signals, producing a set of signals representative of the likelihood of the utterance speech pattern being in a prescribed state of the N state Markov model template during said speech pattern frame; and in the speech pattern frame processing intervals responsive to the likelihood representative signal corresponding to the reference pattern Markov model template being in the last state during the last speech pattern frame, forming a signal representative of the probability of the speech pattern being obtained from the reference pattern N state Markov model template.

10. A method for recognizing an utterance as one of a plurality of reference patterns according to claim 9 wherein:

the step of producing said set of likelihood representative signals in each speech pattern frame processing interval comprises:

generating a set of signals representative of the probability that the reference template Markov model for the utterance speech pattern portion up to the current frame is in each of the reference template Markov model states responsive to the first and second type signals.

11. A method for recognizing an utterance as one of a plurality of reference patterns according to claim 8 wherein:

N is smaller than the number of frames in the sequence of acoustic feature signal frames of the smallest of said reference patterns.

12. A method for recognizing an utterance as one of a plurality of reference patterns according to claim 10 wherein:

the step of storing the set of K prescribed feature signals comprises storing K linear predictive feature prototype signals covering the range of acoustic features of the frame sequence of acoustic feature signals of the reference patterns; and the step of forming a sequence of acoustic feature signals representative of the utterance speech pattern comprises forming a sequence of linear predictive feature signals representative of the utterance speech pattern.

13. A method for recognizing an utterance as one of a plurality of reference patterns according to claim 12 wherein the second type signals corresponding to transitions from a first distinct state $i<N$ to a second distinct state $j<=N$, $j<i$ and $j>i+2$ are zero value signals.

14. A method for recognizing an utterance as one of a plurality of reference patterns according to claims 8, 9, 10, 11, 12, or 13 wherein said speech pattern is an utterance of a word and each reference pattern is an identified spoken word speech pattern.

15. A speech analyzer for recognizing an utterance as one of a plurality of vocabulary words comprising:

a first memory for storing a set of K vector quantized prototype signals each representative of a linear predictive acoustic feature in the frame sequence of acoustic features of utterances of said plurality of vocabulary words;

a second memory for storing a plurality of vocabulary reference templates, each template corresponding to an N state constrained hidden Markov model of a vocabulary word and including;

a signal corresponding to an initial state of said constrained hidden Markov model, signals corresponding to $N-2$ intermediate states of said constrained hidden Markov model, a signal corresponding to the Nth final state of said constrained hidden Markov model, the number of states N being preselected to be less than the number of acoustic features in the sequence of acoustic features of the shortest vocabulary word, a set of first type signals each representative of the probability of a prototype feature signal being in a predetermined state of said constrained hidden Markov model, and a set of second type signals each representative of the probability of transition between a predetermined pair of said vocabulary word constrained hidden Markov model states;

first means responsive to the utterance for forming an M time frame sequence of linear predictive acoustic feature signals representative of the speech pattern of the utterance;

second means operative responsive to said speech pattern feature signals and said stored prototype acoustic feature signals for generating a sequence of M prototype acoustic feature signals representative of said utterance speech pattern;

said second means being jointly responsive to said sequence of M prototype feature signals representative of the utterance and the signals of the N state constrained hidden Markov model of the vocabulary word template for forming a third type signal representative of the likelihood of the unknown utterance being the vocabulary word including means for producing a sequence of speech pattern frame processing interval signals, said second means being operative in the first time processing interval responsive to the first frame prototype feature signal, the vocabulary word Markov model first state and first type signals for forming a signal representative of the likelihood of the first frame prototype feature signal being in the vocabulary word Markov model first state, and operative in each of the second to the Mth speech pattern frame processing intervals responsive to the Markov model state signals, the current frame prototype feature signals, the first type and second type signals, and the likelihood signals of the immediately preceding frame processing interval for forming a set of signals each representative of the likelihood of the current frame prototype feature signal being in a prescribed state of the vocabulary word Markov model, and means responsive to the likelihood signal corresponding to the Nth final state in the Mth speech pattern frame processing interval for generating the third type signal for said vocabulary word representative of the likelihood of the utterance being the vocabulary word; and means responsive to the third type signals for the plurality of vocabulary words for generating a signal identifying the utterance as the vocabulary word having the largest third type signal.

*16. A speech analyzer for recognizing an utterance as one of a plurality of reference patterns each having a frame sequence of acoustic feature signals comprising:*

*means for storing signals representative of acoustic features of said plurality of reference patterns;*

*means for storing a plurality of templates each representative of an identified spoken reference pattern, the template of each spoken reference pattern comprising signals representative of a first state, a last state and preselected number N−2 intermediate states between said first and last states of a constrained hidden Markov model of said spoken reference pattern, N being independent of the number of acoustic feature frames in the acoustic feature frame sequence of the identified spoken reference pattern, a plurality of first type signals each representative of the likelihood of an acoustic feature signal of a reference pattern frame being in a predetermined one of said states, and a plurality of second type signals each representative of the likelihood of a transition from an acoustic feature signal in one of said states to another of said states of said template;*

*means responsive to the utterance for forming a time frame sequence of acoustic feature signals representative of the speech pattern of the utterance;*

*means responsive to said utterance feature signal sequence and said stored acoustic feature signals for selecting a sequence of said feature signals representative of the utterance speech pattern;*

*means jointly responsive to said sequence of feature signals representative of the utterance and the reference pattern template N state constrained hidden Markov model signals for combining said utterance representative sequence of feature signal sequence with said reference pattern N state Markov model template signals to form a third type signal representative of the likelihood of the unknown utterance being the spoken reference pattern; and*

*means responsive to the third type signals for the plurality of reference patterns for generating a signal to identify the utterance as one of the plurality of reference patterns.*

*17. A speech analyzer according to claim 16 wherein said third type signal generating means comprises:*

*means for successively generating speech pattern frame processing interval signals for the sequence of acoustic feature signals;*

*means operative in the current speech pattern frame processing interval responsive to the utterance representative feature signal of the current speech pattern frame and the reference pattern template N state constrained hidden Markov model signals for producing a set of signals representative of the likelihood of the utterance speech pattern being in a particular state of the Markov model template during said speech frame; and*

*means operative in the speech frame processing intervals responsive to the likelihood representative signal corresponding to the reference pattern Markov model template being in the last state during the last speech pattern frame for forming a signal representative of the likelihood of the speech pattern being obtained from the reference pattern N state Markov model template.*

*18. A speech analyzer according to claim 17 where:*

*said means for producing said set of likelihood representative signals in each speech pattern frame processing interval comprises means responsive to the first and second type signals for generating a set of signals representative of the likelihood that the reference template Markov model for the utterance speech pattern portion up to the current frame is in each of the reference template Markov model states.*

* * * * *

UNITED STATES PATENT AND TRADEMARK OFFICE

CERTIFICATE OF CORRECTION

PATENT NO. : Re. 33,597

DATED : May 28, 1991

INVENTOR(S) : S. E. Levinson, L. R. Rabiner, M. M. Sondhi

It is certified that error appears in the above-identified patent and that said Letters Patent is hereby corrected as shown below:

On the cover page following line [76] Inventors and before line (21) Appl. No., insert Assignee:
--American Telephone and Telegraph Company, AT&T Bell Laboratories, Murray Hill, N.J.--.

Signed and Sealed this

Sixth Day of July, 1993

Michael K. Kirk

*Attest:*

MICHAEL K. KIRK

*Attesting Officer*

*Acting Commissioner of Patents and Trademarks*